United States Patent [19]

Bilanceri

[11] 4,275,893
[45] Jun. 30, 1981

[54] SELF-TIGHTENING KEYLESS CHUCK
[75] Inventor: Silvio G. Bilanceri, Owings Mills, Md.
[73] Assignee: Black & Decker Inc., Newark, Del.
[21] Appl. No.: 71,663
[22] Filed: Aug. 31, 1979
[51] Int. Cl.³ .............................................. B23B 31/19
[52] U.S. Cl. ................................. 279/64; 128/92 EB; 279/59; 279/75
[58] Field of Search ...................... 279/56, 59, 72, 75, 279/64, 30, 28, 22, 15 G; 128/92 EB

[56] References Cited
U.S. PATENT DOCUMENTS
1,679,299 7/1928 Fegley et al. .......................... 279/56

FOREIGN PATENT DOCUMENTS
89122 8/1922 Austria ........................................ 279/59
89124 8/1922 Austria ........................................ 279/72
342380 10/1921 Fed. Rep. of Germany ............. 279/56
395322 5/1924 Fed. Rep. of Germany .

Primary Examiner—Z. R. Bilinsky
Attorney, Agent, or Firm—Harold Weinstein; Leonard Bloom; Edward D. Murphy

[57] ABSTRACT

A bi-directional, self-tightening drill chuck suited for surgical and other medical applications in accordance with the present invention includes a chuck body having an internally tapered opening at one end that is defined by first and second cam surfaces and a central, longitudinally extending cannula or passage formed through the length of the chuck body. A plurality of tapered gripping rollers are located within the opening and are resiliently urged against the cam surfaces throughout a range of adjustment by a spring retainer which includes rearwardly extending spring arms. A control sleeve is adjustably mounted on the chuck body and includes a thrust bearing at one end for contacting the forwardly facing ends of the tapered rollers and a split retainer assembly at its other end for contacting the rearwardly extending ends of the spring arms such that the tapered rollers and the spring retainer move as a unit relative to the chuck body when the control sleeve is adjusted to cause the tapered rollers to grip a selected tool bit. The chuck can accept a tool bit, such as a common twist drill, or other implements at one end through a tool receiving opening formed in the control sleeve or from the opposite end through the cannula. In operation, the torque transmitted through the chuck causes the tapered rollers to shift circumferentially relative to the cam surfaces and proportionally increase the gripping force applied to the tool bit.

25 Claims, 11 Drawing Figures

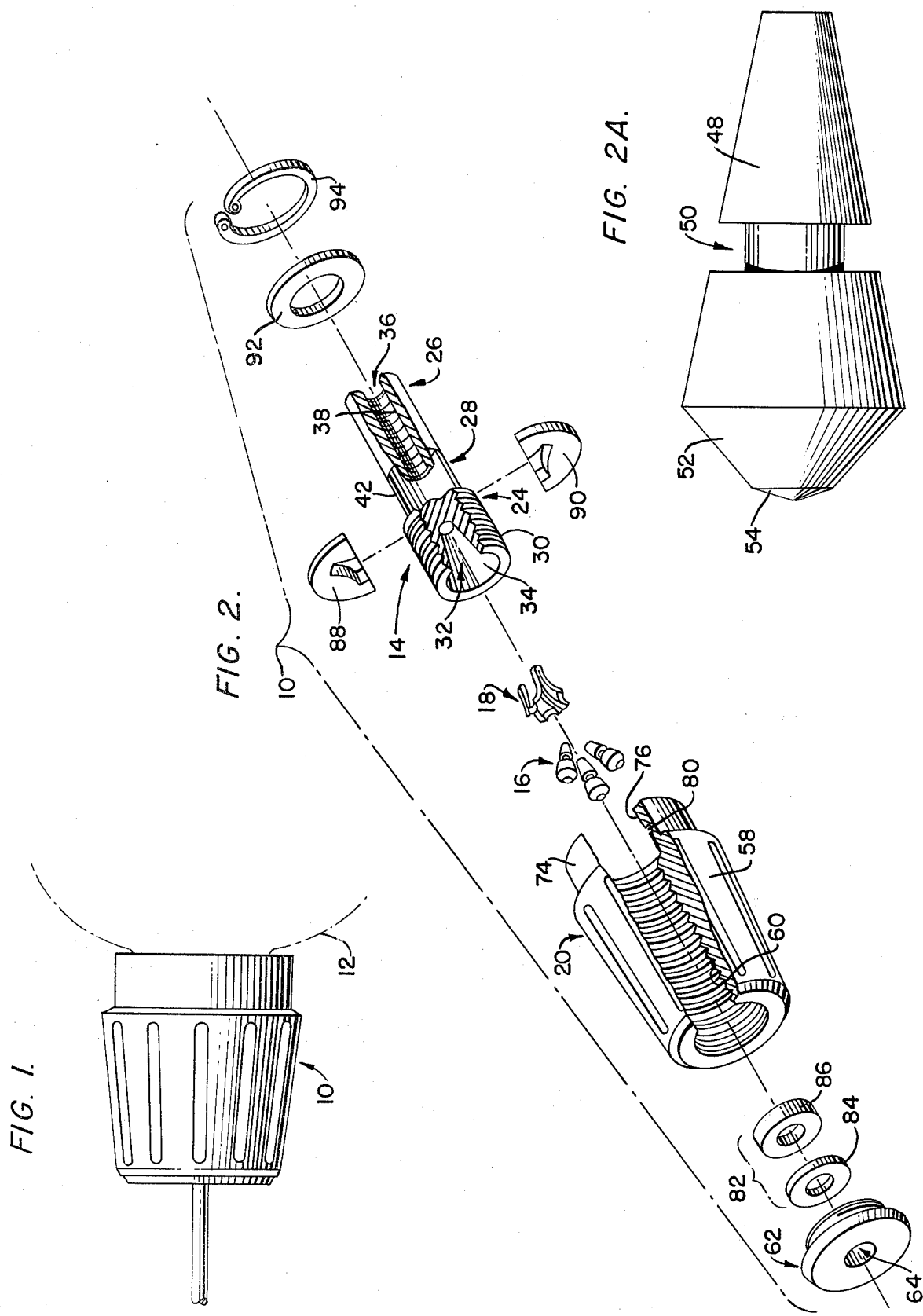

SELF-TIGHTENING KEYLESS CHUCK

CROSS-REFERENCE TO RELATED APPLICATION

The subject matter of the present patent application is related to that disclosed in U.S. patent application Ser. No. 940,898 filed Sept. 11, 1978, now abandoned by John D. Vogel for a Keyless Chuck and assigned to the assignee of the present invention.

BACKGROUND OF THE INVENTION

The present invention relates to an improved chuck for gripping a tool bit or the like and, more particularly, to an improved self-tightening chuck in which a tool bit can be inserted from one end through a tool receiving opening or from the other end through a central cannula and in which the gripping force applied to the tool bit increases with the torque applied through the chuck.

Various drill chucks are known for releasably gripping a tool bit such as a twist drill. The most common drill chuck in use is the Jacob-type chuck used on portable electric drills. This chuck includes wedge-like jaws located in a nosepiece with the jaws adapted to converge on and tighten about the stem of the tool bit. The chuck includes a cylindrical adjusting sleeve that is rotated relative to a chuck body to effect tightening. This sleeve typically includes axially extending teeth that are adapted to cooperate with a separate gear-type tightening key to effect tightening and loosening of the chuck. While the performance of the Jacob-type chuck is generally satisfactory in industrial and consumer applications, the separate tightening key requires a minimum level of mechanical skill on the part of the user and also requires that the tightening key be kept available for use on an as-required basis.

When adapting a Jacob-type chuck to medical applications, for example, for use on portable electric drills used in orthopedic surgery, the requirement for the separate tightening key increases the number of manual manipulations that must be performed by the surgeon during the operation and increases the burden on the nursing assistant who is responsible for the various surgical instruments. The extra manual manipulations are especially burdensome when inserting long pins or wires of indeterminate length into bone and tissue to permanently reinforce the bone structures or to secure bone fragments in place during the healing process. When inserting wires into bone and/or tissue, the wire is usually loaded into the surgical drill through a central cannula or passage and is tightened in the chuck with a short segment of the wire extending axially outward from the chuck. After this first short segment is inserted in place, the chuck is loosened and the drill retracted another short segment along the wire and retightened with this second segment then inserted. This insertion sequence, including the manual tightening and loosening steps, is repeated until the desired length of wire is in place. As can be appreciated, the tightening and loosening steps required for the insertion of each short segment increases the number of manual manipulations that must be performed and is especially burdensome when a large number of long wires must be inserted to secure bone fragments into place.

Various drill chucks, known as self-tightening chucks, have been designed in an effort to eliminate the need for the tightening key. These chucks have included gripping jaws or elements that cooperate with cam surfaces to self-tighten on the drill bit and have included gripping jaws which toggle to increase the gripping force. While these types of self-tightening drill chucks have been generally satisfactory for industrial and consumer applications, they are not particularly suited for orthopedic applications. For example, the ratio of the range of adjustment, that is, the ratio of the largest to the smallest tool bit diameters that can be accepted by these prior chucks is such that they cannot accept both the small-diameter reinforcing wires and the larger diameter pins commonly used in orthopedic applications. From a practical standpoint, these prior chucks are typically fabricated by press or shrink fitting the various parts together to form a permanently assembled unit. From a medical standpoint, this type of fabrication prevents convenient disassembly of the chuck for cleaning purposes.

SUMMARY OF THE INVENTION

In view of the above, it is an object of the present invention, among others, to provide a keyless, self-tightening chuck which eliminates the need for a tightening key and which is reliable in operation and inexpensive to manufacture.

It is another object of the present invention to provide a keyless, self-tightening drill chuck which can be reliably operated with a minimum level of manual manipulation.

It is another object of the present invention to provide a keyless, self-tightening drill chuck for releasably gripping tool bits in which the gripping force applied to the tool bit increases in proportion to the torque applied through the chuck.

It is still another object of the present invention to provide a keyless, self-tightening drill chuck in which the gripping force applied to the workpiece increases in response to the torque applied through the drill bit regardless of the direction of rotation of the chuck.

It is a further object of the present invention to provide a keyless, self-tightening drill chuck for surgical applications in which the chuck is relatively easy to disassemble for cleaning.

It is a further object of the present invention to provide a keyless, self-tightening drill chuck having a large range-of-adjustment ratio compared to prior self-tightening chucks.

It is a still further object of the present invention to provide a chuck for surgical applications which can accept a tool bit through a tool receiving opening at one end thereof or through a central cannula from the other end thereof.

In accordance with these objects, and others, the present invention provides a bidirectional, self-tightening drill chuck that includes a chuck body adjustably connected to a control sleeve. The chuck body includes an internal, tapered opening at one end defined by cam surface means and a central cannula or passage extending axially through the body. Tapered gripping rollers are located within the internal opening and are resiliently urged against the cam surface means throughout a range of adjustment by a spring retainer that includes an elongated, rearwardly, extending spring arm for each gripping roller. The control sleeve is adjustably mounted on the body and includes a thrust bearing surface at one end for contacting the forward ends of the gripping rollers and a split-retainer assembly at the other end for contacting the rearwardly extending ends of the spring arms such that the gripping rollers and the spring retainer are retained between the thrust bearing surface and the split-retainer assembly to move as a unit relative to the chuck body throughout the range of adjustment.

In operation, the stem portion of a tool bit or other implement is inserted into a tool receiving gap between the gripping rollers and the control sleeve is manually adjusted to cause the gripping rollers to slide relative to the cam surface means and converge upon and grip the tool bit. When the tool bit is applied to a workpiece, the torque transmitted through the chuck causes the gripping rollers to shift circumferentially relative to the cam surface means to increase the gripping force applied to the tool bit in a torque responsive manner.

The drill chuck advantageously eliminates the need for a tightening key, minimizes the manual manipulation necessary to grip a tool bit or other implement, and provides a drill chuck which can be conveniently disassembled for cleaning. In addition, the chuck can accept tool bit, such as a twist drill, through a tool receiving opening in the control sleeve or through the cannula from the opposite end.

BRIEF DESCRIPTION OF THE DRAWINGS

The above description, as well as the objects, features, and advantages of the present invention will be more fully appreciated by reference to the following detailed description of a presently preferred, but nonetheless illustrative, embodiment in accordance with the present invention, when taken in conjunction with the accompanying drawings wherein:

FIG. 1 is a partial, side elevational view of a drill chuck in accordance with the present invention mounted on an exemplary electric drill (broken-line illustration) and gripping a small-diameter tool bit;

FIG. 2 is an exploded perspective view of the drill chuck shown in FIG. 1 with selected parts broken away for reasons of clarity;

FIG. 2A is a side elevational view of the tapered gripping rollers shown in FIG. 2;

DESCRIPTION OF THE PREFERRED EMBODIMENT

Figure 3:
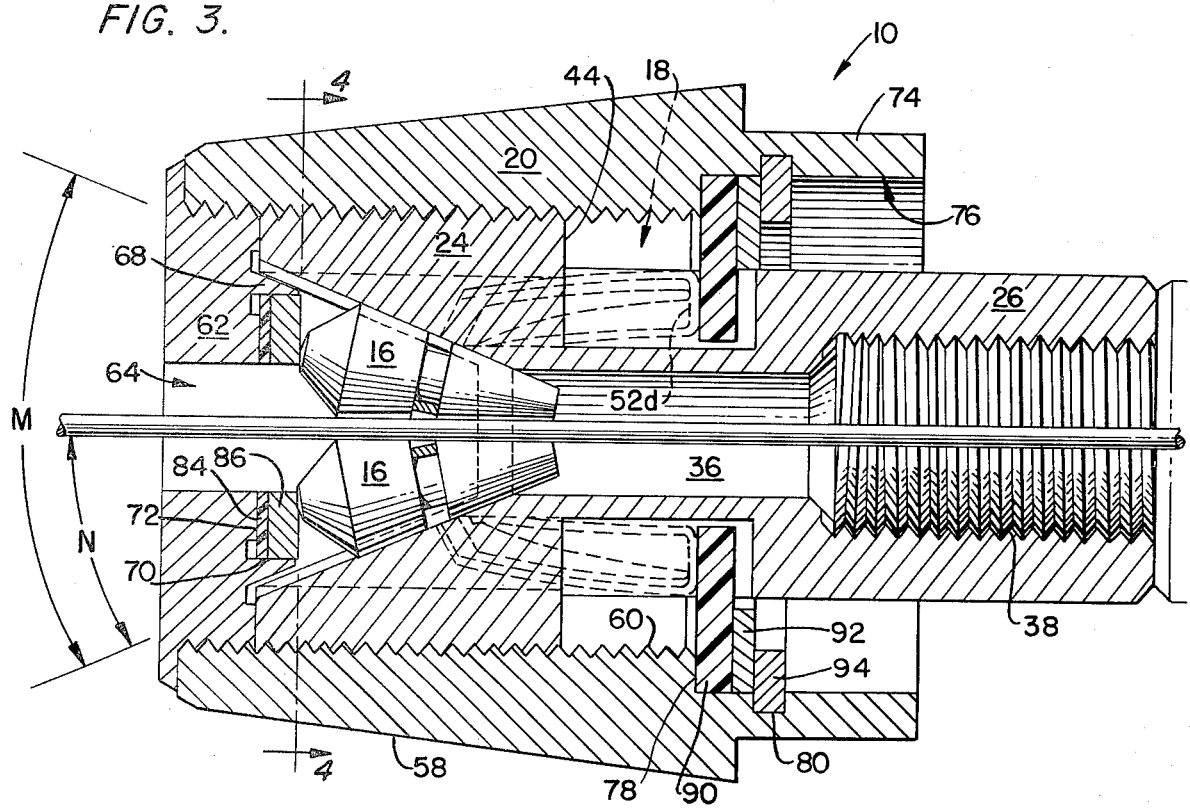
FIG. 3 is a side elevational view, in cross section, of the drill chuck of FIGS. 1 and 2 shown gripping a small-diameter, longitudinally extending wire of indeterminate length and with a spring retainer element shown in broken-line illustration.
Figure 5:
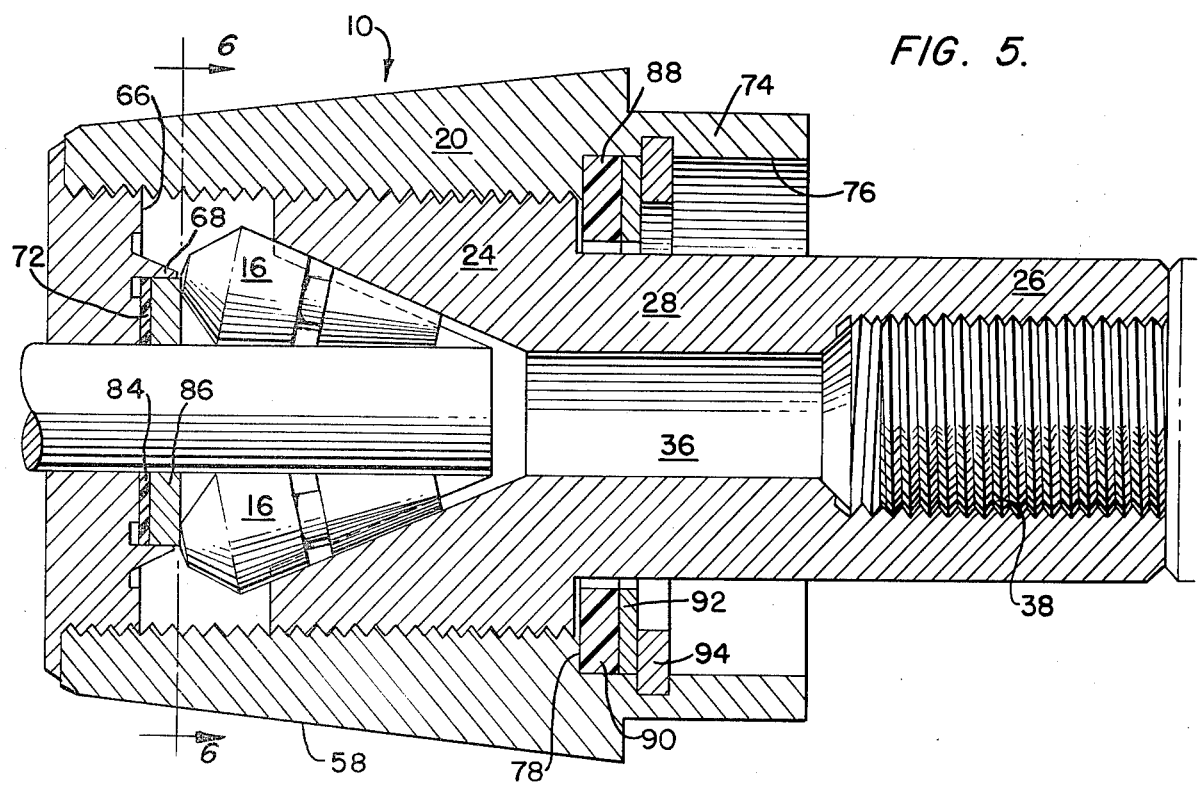
FIG. 5 is a side elevational view, in cross section, similar to that of FIG. 3, showing the drill chuck gripping a large-diameter bit and with the spring retainer element of FIG. 3 omitted for reasons of clarity.

A drill chuck in accordance with the present invention is generally designated in the Figures by the reference character 10 and is shown is FIG. 1 mounted on an exemplary portable electric drill 12 (broken-line illustration). As shown in FIGS. 2, 3, and 5, the chuck 10 includes a longitudinally extending chuck body 14, a plurality of tapered gripping rollers 16 located within the chuck body, a spring retainer 18 for maintaining the gripping rollers in place within the chuck body, and a control sleeve 20 adjustably mounted on the chuck body.

The chuck body 14 is formed generally about a longitudinal axis 22 and includes an enlarged head 24 formed at its forward end, a cylindrical axially extending stem 26 formed at its other rearward end, and an intermediate transition portion 28 formed between the head 24 and the stem 26. The head 24 includes external threads at 30 and has an internally tapered cavity or opening 32 formed at the forward end and defined by a tapered surface 34 with the opening 32 converging from a wide forward end to a narrow interior end. The tapered surface 34 includes first and second cam surfaces described in more detail below. The chuck body 14 includes a coaxial passage or cannula 36 that extends from the narrow end of the opening 32 along the longitudinal axis 22 through the intermediate portion 28 and the stem 26 of the chuck body. The stem 26 is formed as an axially extending cylinder that is counterbored and internally threaded at 38 (FIGS. 3 and 5) to engage the external threads of a spindle (not shown) of a drive source such as the electric drill 12. The spindle is preferably hollow such that the cannula 36 of the chuck body 14 is in registration with the hollow spindle to define a continuous, elongated through-passage. The intermediate portion 28 of the chuck body 14, which is shown in cross section in FIG. 10, includes three semicircular, axially extending cut-outs 40 formed in the chuck body. The cutouts 40 may be formed by aligning the axis of a side-cutting mill parallel to the longitudinal axis 22 of the chuck body 14 and cutting radially inward a selected distance at three equally spaced positions about the chuck body. The cut-outs 40 define three radially extending, equally spaced lobes 42 that extend from a back-face 44 (FIG. 3) of the head 24 to the stem 26.

Figure 4:
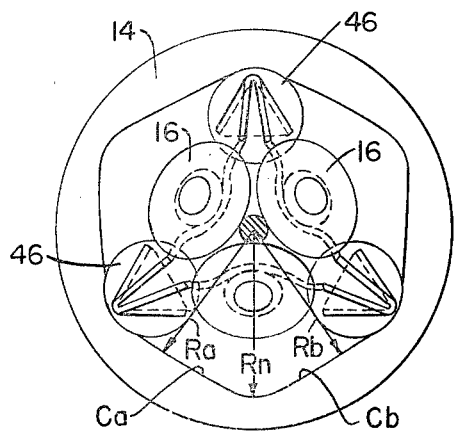
FIG. 4 is an end view, in cross section, of the drill chuck shown in FIG. 3 taken along line 4—4 of FIG. 3.
Figure 6:
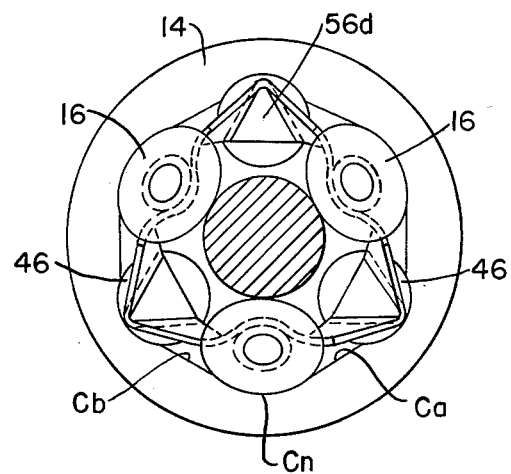
FIG. 6 is an end view, in cross section, of the drill chuck shown in FIG. 5 taken along line 6—6 of FIG. 5.
Figure 9:
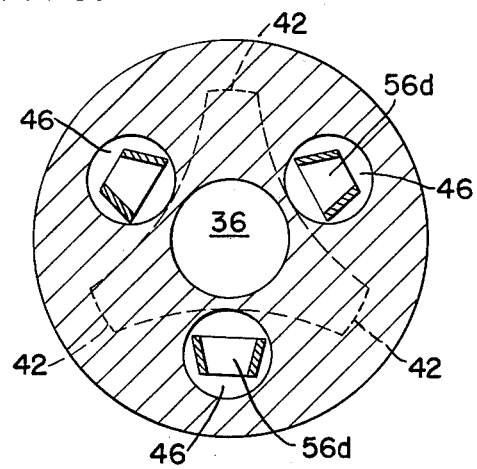
FIG. 9 is an enlarged view, in cross section, of the chuck body of FIG. 8 taken along line 9—9 of FIG. 8.
Figure 8:
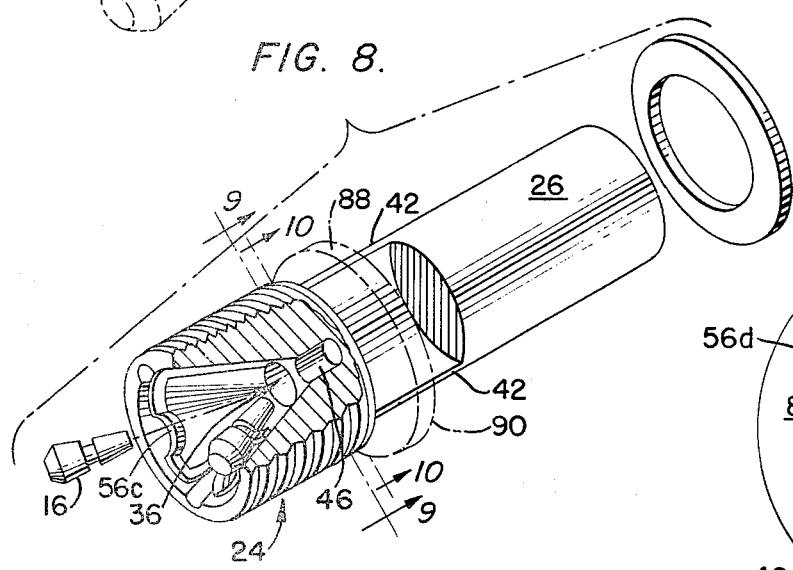
FIG. 8 is an exploded perspective view of a chuck body and the retainer spring and gripping rollers of FIG. 7 with selected parts omitted or partially shown for reasons of clarity.

As shown in FIGS. 6, 8, and 9, the head portion 24 of chuck body 14 has three axially extending passageways 46 that are radially spaced from the axis 22 and extend axially from the tapered surface 34 through the head portion 24 to open on the back-face 44. As shown in FIGS. 4 and 6, the passageways 46 are located between the gripping rollers 16 and, as shown in FIGS. 8 and 9, are oriented relative to the chuck body 14 such that they open on the back-face 44 between the lobes 42 of the intermediate portion 28.

The gripping rollers 16 (FIG. 2A) are formed as a generally biconical element having a first truncated conical portion 48 that has a peripheral recess 50 formed therein, a second conical portion 52 that defines a blunt, forwardly facing end, and a conical formation 54 at the forwardmost end of the gripping roller that acts as a thrust receiving surface as described below.

The internal opening 32 is formed at a selected cone angle M (FIG. 3) and the tapered gripping rollers 16 are formed at a selected cone angle N that is one half the cone angle M such that those surface portions of the gripping rollers that face inwardly towards the longitudinal axis 22 are substantially parallel to, concentric with, and equally spaced from the axis 22. In the preferred embodiment, the internal opening 32 is formed with a cone angle M of 45° and the gripping rollers 16 are formed at a cone angle N of 22½°.

Figure 7:
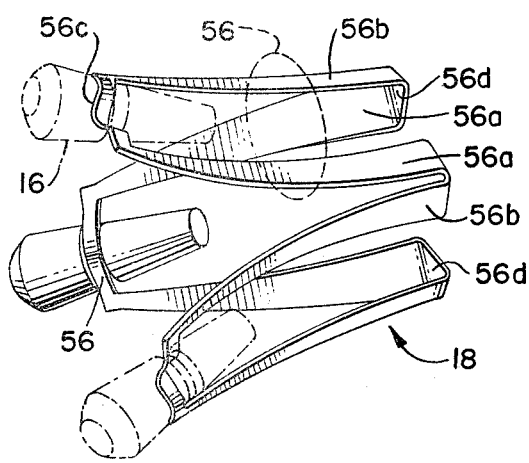
FIG. 7 is a perspective view of a retainer spring and cooperating gripping rollers shown in both solid-line and broken-line illustrations.
Figure 10:
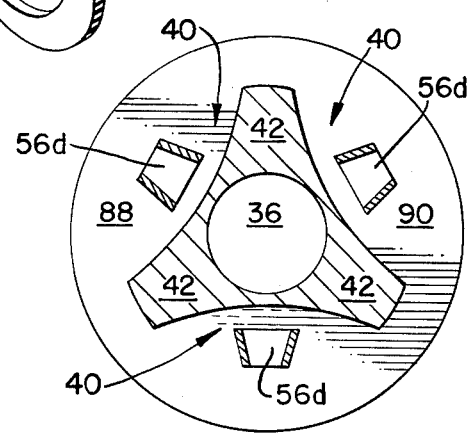
FIG. 10 is an enlarged view, in cross section, of the chuck body of FIG. 8 taken along line 10—10 of FIG.

The spring retainer 18 maintains the gripping rollers 16 in position in the internal opening 32 and resiliently urges the rollers against the tapered surface 34 of the opening throughout the range of adjustment of the chuck 10. As shown in FIG. 7, the spring retainer 18 includes a bifurcated spring arm 56 for each gripping roller 16 with each spring arm including a leaf 56a and another leaf 56b. The forward distal ends of the leaves 56a and 56b of each spring arm are connected together by an arcuate cross piece 56c and the rearwardly extending end of each leaf is joined by a connecting segment 56d to the next adjacent leaf, that is, the rearwardly extending end of each leaf 56a is connected through a connecting segment 56d to the rearwardly extending end of the leaf 56b of the next adjacent spring arm. Each spring arm 56 bows gradually outward in the radial direction as it extends in the forward direction. As is shown in FIG. 8, the cross piece 56c at the distal ends of each arm 56 is adapted to fit within the peripheral recess 50 of its respective tapered roller 16 to resiliently urge the roller into contact with the tapered surface 34. The rearwardly extending ends of each joined pair of arms 56a and 56b and their connecting segment 56d extend through respective axial passageways 46 into the cutouts 40 between the lobes 42 (FIGS. 9 and 10). Each spring arm 56 resiliently urges its respective gripping roller 16 outwardly against the tapered surface 34 and assists in maintaining the gripping rollers in a substantially equally angular distribution about the longitudinal axis 22 and in aligning the rollers 16 in a plane substantially transverse to the longitudinal axis 22 such that the end of one roller does not axially lead or lag the end of the other rollers. In the preferred embodiment, the spring retainer 18 is manufactured from a die-stamped and heat-treated beryllium-copper alloy.

The control sleeve 20 is formed as a hollow body of revolution about the longitudinal axis 22 and includes an outside surface 58 which is preferably striated or provided with a knurled surface to permit convenient manual gripping. The control sleeve 20 is provided with internal threads at 60 to permit the control sleeve to engage the threads 30 of the chuck body 14 and adjustably rotate relative thereto. An end cap 62 is provided at the forwardly facing end of the control sleeve 20 and is secured into place by a threaded connection. The end cap 62 includes a centrally located, tool receiving opening 64, an interior stop surface 66, and a circular, axially extending abutment 68 formed on its inner side. The abutment 68 is counterbored to define a cylindrical inside diameter surface 70 and an axial shoulder surface 72. The rearwardly facing end of the control sleeve 16 includes a rearwardly extending cylindrical portion 74 that is counterbored to define an inside diameter surface 76 and an axially aligned shoulder face 78. A circumferential groove 80 is provided on the inside diameter surface 76 of the counterbore spaced rearwardly of the shoulder face 78.

A thrust bearing assembly, generally designated by the reference character 82, is located within the counterbored abutment 68 of the end cap 62 and includes a first thrust receiving washer 84 that abuts the shoulder surface 72 of the end cap and a second thrust receiving washer 86 that abuts the first washer 84 on one side and also contacts the forwardly facing ends 54 of the tapered gripping rollers 16 on the other side as shown in FIGS. 3 and 5. The first washer 84 is fabricated from a self-lubricating, solid lubricant material that has a low coefficient of friction while the second washer 86 is fabricated from a metal such as stainless steel. Preferably, the first washer 84 is fabricated entirely from polytetrafluoroethylene (PTFE) which has a sufficiently low coefficient of friction such that the second thrust receiving washer 86 can rotate relative to the first washer 84.

A split-retainer assembly that includes split-retainers 88 and 90 and a backup washer 92 is located within the counterbored cylindrical portion 74 of the control sleeve 20 and is held in place by an internal snap ring 94 located within the circumferential groove 80 with the snap ring abutting the backup washer 92 as shown in FIGS. 3 and 5. Each of the split-retainers 88 and 90 are formed from a self-lubricating solid-lubricant maerial, such as PTFE, or, in the alternative, a PTFE-coated metal. As shown in FIG. 2, each of the split-retainers 88 and 90 includes a circular outer periphery with the profile of the radially extending lobes 42 removed from the central portion of the split-retainers such that the split-retainers fit over and encircle the lobes 42 of the intermediate portion 28 of the chuck body 14.

The gripping rollers 16 and the spring retainer 18, in their assembled position, are captured or restrained between the thrust bearing assembly 82, which contacts the forwardmost ends 54 of the gripping rollers 16, and the split-retainers 88 and 90, which contact the connecting pieces 56d at the rearwardly extending ends of each spring arm 56 such that the gripping rollers and the spring move as a unit with movement of the control sleeve 20 relative to the chuck body 14.

As mentioned above, the tapered wall surface 34 of the internal opening 32 is provided with cam surfaces that permit the gripping rollers 16 to self-tighten as described in more detail below. As shown in FIGS. 4 and 6, the cam surfaces include neutral cam surfaces $C_n$ that are equally-spaced from each other about the longitudinal axis 22 with each neutral cam surface positioned intermediate the axially aligned openings 46. For a selected axial plane transverse to the longitudinal axis 22, each neutral cam surface $C_n$ is formed at a corresponding radius R from the longitudinal axis. Cam surfaces $C_a$ and $C_b$ are formed immediately adjacent to and on opposite sides of the neutral cam surface $C_n$ with the cam surface $C_a$ and $C_b$ formed at a radius that is substantially equal to the neutral cam radius $R_n$ near the neutral cam surface $C_n$ with the radius of the cam surface $C_a$ and $C_b$ respectively diminishing to values $R_a$ and $R_b$ as the cam surfaces $C_a$ and $C_b$ extend from the neutral cam surface. Each gripping roller 16 is designed to circumferentially shift in response to the torque applied through the chuck from their respective neutral cam surfaces $C_n$ onto the adjacent cam surfaces $C_a$ or $C_b$ to increase the gripping force applied by the gripping rollers to a tool bit.

To insert a tool bit into the chuck, the control sleeve 20 is manually rotated relative to the chuck body 14 to cause the sleeve to advance in an axially forward direction, that is, to the left in FIGS. 3 and 5. As the control sleeve 20 moves in the axially forward direction, the split-retainers 88 and 90, which contact the connecting segments 56d of each spring arm 56, carries the spring retainer 18 and the gripping rollers 16 in the forward direction. Since the split-retainers 88 and 90 are keyed to the lobes 42 by their complementary profiles, the control sleeve 20 rotates relative to the split-retainers 88 and 90 with the split-retainers moving axially relative to the intermediate portion 28 of the chuck body. During the movement of the control sleeve 20, the PTFE coating of the split-retainers 88 and 90 minimizes the friction between the relatively moving parts. As the gripping rollers 16 move relative to the tapered surface 34 in the forward direction, they are resiliently urged outwardly by their respective spring arms 52 against the neutral cam surfaces $C_n$ to enlarge the tool receiving gap defined between the gripping rollers. When the tool receiving gap is sufficiently large, the stem portion of a tool bit, such as a common twist drill, is inserted into the tool receiving gap and the control sleeve rotated in the opposite direction to cause the control sleeve to move in a rearward direction, that is, to the right in FIGS. 3 and 5. As the control sleeve 20 rotates and moves in the rearward direction, the washer 86 of the thrust washer assembly 82 bears against the blunt forwardly extending ends 54 of the gripping rollers 16 and urges them in a rearward direction. As the gripping rollers 16 move rearwardly relative to their respective neutral cam surfaces $C_n$, they converge upon and engage the stem portion of the tool bit. The control sleeve 20 is fruther manually rotated to hand-tighten the gripping rollers 16 against the tool bit and to assure that each gripping roller is in its respective neutral cam surface $C_n$ position. The thrust washer 86 abuts the ends 54 of the gripping rollers 16 and assures that the gripping rollers are axially aligned relative to one another, that is, that none of the gripping rollers lead or lag the other during their movement relative to the tapered surface 34, and the spring retainer 18 assists in preventing the gripping rollers 16 from skewing relative to the longitudinal axis 22. When the control sleeve 20 is handtightened, the gripping rollers 16 are preloaded against the tapered surface 34 with an axial compressive force. A portion of this preload is resolved by the tapered geometry of the wall surface 34 and the gripping rollers 16 into the radially directed gripping force applied against the tool bit.

When a small-diameter tool bit such as the elongated wire shown in FIG. 3 is tightened into the chuck 10, the gripping rollers 16 are located near the rearward, interior end of the tapered surface 34, and, when a large diameter tool bit is tightened into the chuck 10, as shown in FIG. 5, the gripping rollers 16 are located near the forwardly facing side of the tapered surface 34.

After the drill bit is hand-tightened into the chuck 10, the bit is applied to a work piece and a drive source, such as a pistol-grip electric drill, and is operated to supply a driving torque to the tool bit. As the tool bit penetrates the work piece, the resistance provided by the work piece generates a reaction torque through the tool bit that is overcome by the torque transmitted from the drive source. The torque applied to the tool bit causes the gripping rollers 16 to shift circumferentially relative to their respective neutral cam surfaces $C_n$. As the gripping rollers 16 leave the neutral cam surface $C_n$, they roll onto either of the adjacent cam surfaces $C_a$ or $C_b$ (depending upon the direction of rotation of the chuck 10) and, by virtue of the change in the cam surface profile, increase the loading on the gripping rollers 16. This increase in loading is resolved by the tapered geometry of the gripping rollers 16 and the tapered surface 34 into an increased gripping force applied to the tool bit and to a thrust force applied against the thrust washer assembly 82. Because of the relatively low coefficient of friction between the PTFE washer 84 and the metal thrust washer 86, the metal washer can shift circumferentially with the gripping rollers 16 as they self-tighten on the tool bit. Since the cam surfaces $C_a$ and $C_b$ are formed on opposite sides of the neutral cam $C_n$ position, the chuck 10 is bidirectional with the self-tightening feature occurring for rotation in either a first or a second direction.

When the tool bit is removed from the work piece, the torque transmitted through the chuck 10 is diminished allowing the gripping rollers 16 to stress-relax and cause them to return to their neutral cam surfaces $C_n$.

The gripping rollers 16, by virtue of their conical configuration, enhance the transfer of the reaction torque from the tool bit to the chuck body 14 by cooperating with the internal surface 34 of the chuck body in a manner analogous to a planetary gear train. More specifically, the stem portion of the tool bit, the gripping rollers 16, and the chuck body 14 are analogous to, respectively, the sun, the planets, and the ring of a planetary set.

While a chuck in accordance with the present invention is suited for a wide variety of industrial and consumer applications, it is especially suited for medical and surgical applications. The keyless nature of the chuck permits the chuck to accept tool bits without the manual manipulation necessary to effect tightening and loosening of the chuck, and the longitudinal extending cannula permits tool bits such as wires of indeterminate length to be inserted into the drill from either end. In addition, the chuck can be easily disassembled for cleaning with a minimum of effort by simply removing the internal snap ring, the back-up washer, and the split-retainers.

As will be apparent to those skilled in the art, various changes and modifications may be made to the self-tightening chuck of the present invention without departing from the spirit and scope of the invention as recited in the appended claims and their legal equivalent.

What is claimed is:

1. A chuck for releasably gripping a tool bit or the like, said chuck comprising:

a chuck body axially extending along a chuck axis having an internal opening formed therein, said opening being defined by a surface that includes a cam surface means thereon;

a plurality of gripping elements for gripping a tool bit located within said opening and movable relative to said cam surface means throughout a range of adjustment;

resilient urging means for resiliently urging said gripping elements against said cam surface means, said urging means including elongated urging members for each of said gripping elements, said urging members coupled at a forwardly facing first end to their respective gripping elements and extending in a rearwardly direction to a rearwardly facing second end; and a control sleeve means adjustably mounted on said chuck for moving said gripping elements throughout said range of adjustment, said control sleeve means including a thrust receiving bearing surface for contacting said gripping elements and a retainer flange means spaced from said thrust receiving bearing surface for contacting said second ends of said urging members, said retainer flange means formed from at least two separable flange elements;

wherein adjustment of said control sleeve relative to said chuck body causes said gripping elements and said resilient urging means to move relative to said chuck body with said gripping elements moving relative to said cam surface means.

2. The chuck claimed in claim 1 in which said control sleeve includes an end face partially enclosing said internal opening to define a tool receiving opening, said thrust receiving surface being defined by a surface portion of said end face facing said internal opening.

3. The chuck claimed in claim 2 wherein the thrust receiving surface comprises:

first and second annular thrust bearing elements, said first thrust bearing element abutting said surface portion of said end face and said second annular thrust bearing element located between said first annular thrust bearing element and said gripping elements.

4. The chuck claimed in claim 3 wherein the coefficient of friction between said first and second thrust bearing elements is lower than the coefficient of friction between said second thrust bearing element and said gripping elements whereby said second thrust bearing element is rotatable relative to said first thrust bearing element.

5. The chuck claimed in claim 4 wherein said first thrust bearing element includes at least a surface portion thereof fabricated from polytetrafluoroethylene.

6. The chuck claimed in claim 1 wherein said control sleeve is formed as a hollow body of revolution about said chuck axis and is rotatably mounted on said chuck for adjustment relative thereto.

7. The chuck claimed in claim 6 wherein said retainer means is formed as a circular flange and said separable flange elements are formed as semi-circular elements.

8. The chuck claimed in claim 7 wherein said separable flange elements are fabricated from polytetrafluoroethylene.

9. The chuck claimed in claim 7 wherein said retainer flange means is keyed to said chuck for axial movement relative thereto and said control sleeve is journalled about the peripheral edge of said retainer flange means for rotation relative thereto.

10. The chuck claimed in claim 9 wherein said chuck body includes an axially extending portion having radially extending lobes and said separable flange elements include complementary surfaces keyed to said lobes.

11. A self-tightening chuck for releasably gripping a tool bit or the like, said chuck comprising:

a chuck body having an internal opening formed therein that extends along a chuck axis, said opening being defined by a surface that includes cam surface means formed thereon and said opening including a second opening in communication therewith being defined as a spring arm receiving opening;

a control sleeve adjustably mounted on said chuck body and axially adjustable relative to said body, said control sleeve including an inwardly extending thrust bearing surface partially enclosing said internal opening to define a tool receiving opening and an inwardly extending retaining flange means axially spaced from said thrust bearing surface, said retaining flange means formed from a plurality of separable elements;

a plurality of gripping elements located within said internal opening for movement relative to said cam surface means throughout a range of adjustment; and spring means for resiliently urging said plural gripping elements against said cam surface means, said spring means including at least one elongated spring arm for each of said gripping elements, one end of each of said spring arms engaging its respective gripping element and the other end thereof extending through a spring arm receiving opening in said tapered surface to engage said retaining flange means such that said gripping elements and said respective spring arms are retained between said thrust bearing surfaces and said retaining flange means for movement with said control sleeve relative to said body;

wherein adjustment of said control sleeve relative to said chuck body causes said control sleeve, said gripping element, and said spring means to move relative to said chuck body with said gripping element moving relative to their respective cam surfaces to grip a tool bit therebetween and wherein the application of a torque through said chuck body causes said gripping elements to move relative to said cam surface means to increase the gripping force applied to the tool bit.

12. A cannulated self-tightening chuck for gripping a tool bit or the like, said chuck comprising:

a chuck body having an internal opening formed therein that extends along a chuck axis and a through-opening formed through the remaining portion of the chuck, said internal opening being defined by a tapered surface that includes a plurality of cam surface means and said opening including a second opening in communication therewith being defined as a spring-arm-receiving opening;

a control sleeve adjustably mounted on said chuck body and axially adjustable reltative to said body, said control sleeve including an inwardly extending thrust bearing surface, and an inwardly extending retainer flange means axially spaced from said thrust bearing surface, said thrust bearing surface partially enclosing said internal opening and defining a tool receiving opening that is in axial registration with said through-opening and said retainer flange means formed from a plurality of separable elements;

a plurality of gripping elements for gripping a tool bit located within said internal opening for movement relative to said cam surface means; and a spring means for resiliently urging said plural gripping elements against said cam surface means and against said thrust bearing surface, said spring means including at least one elongated spring arm for each of said gripping elements, one end of each spring arm engaging its respective gripping elements and the other end thereof extending through an axially extending, spring-arm-receiving opening in said tapered surface to engage said retainer flange means such that said gripping elements and their respective spring arms are retained between said thrust bearing surface and said retainer flange means for movement with said control sleeve relative to said chuck body;

wherein adjustement of said control sleeve relative to said chuck body causes said control sleeve, said gripping elements, and said spring means to more relative to said chuck body with said gripping elements moving relative to their respective cam surfaces to grip a tool bit therebetween and wherein the application of a torque through said chuck body causes said gripping elements to move circumferentially relative to their respective cam surfaces to increase the gripping force applied to the tool bit.

13. The cannulated, self-tightening chuck claimed in claim 12 wherein a tool bit may be inserted through said tool receiving opening and through said through-opening.

14. The chuck claimed in claims 11 or 12 wherein said spring-arm-receiving openings are radially spaced from said chuck axis and equally spaced about said axis, each of said spring-arm-receiving openings adapted to receive a one of said spring arms.

15. The chucks claimed in claim 11 or claim 12 wherein said control sleeve is formed as a hollow body of revolution about said axis with internal threads thereon that are adapted to threadly engage complementary external threads formed on said chuck body to permit said axial adjustment.

16. The chucks claimed in claim 11 or claim 12 wherein said gripping elements are formed as tapered rollers having a wide end and a narrow end.

17. The chuck claimed in claim 16 wherein said internal opening tapers from a wide end towards a narrow end as the axial distance from said thrust bearing surface increases and said tapered rollers are located within said internal opening with their wide end facing said thrust bearing surface.

18. A self-tightening chuck for releasably gripping a tool bit or the like comprising:
   a chuck body having an internal opening formed therein that extends along a chuck axis, said opening being defined by a tapered surface that includes a plurality of cam surface means thereon and said opening including a second opening in communication therewith being defined as an axially extending opening;
   a control sleeve adjustably mounted on said chuck body and axially adjustable relative to said body and including an inwardly extending thrust bearing surface partially enclosing said internal opening and defining a tool receiving opening thereby;
   a plurality of gripping elements located within said internal opening for movement relative to said cam surface means to grip a tool bit, said gripping elements in contact with said thrust bearing surface;
   resilient urging means for resiliently urging said plural gripping elements against said plural cam surface means and against said thrust bearing surface, said reilient urging means including at least one elongated urging member for each of said gripping elements, one end of each of said members engaging its respective gripping element and the other end thereof extending through an axially extending opening in said tapered surface; and
   a retainer flange means extending at least partially between said chuck body and said control sleeve for contacting the other end of said urging members, said retainer flange means including a plurality of separable flange elements;
   wherein adjustment of said control sleeve relative to said chuck body causes said control sleeve, said gripping elements, and resilient urging means to move relative to said chuck body with said gripping elements moving relative to their respective cam surface means to grip a tool bit therebetween and wherein the application torque through said chuck body causes said gripping elements to move circumferentially relative to their respective cam surfaces to increase the gripping force applied to said tool bit.

19. The chuck claimed in claim 18 wherein said retainer flange means is keyed to said chuck body for relative axial translation therebetween and said control sleeve is journalled to said retainer flange means for relative rotation therebetween.

20. The chuck claimed in claim 19 wherein said separable flange elements comprise:
   split washers formed as semi-circular elements and releasably retained in a cylindrical bore formed in said control sleeve with one side of said washers defining a surface for contacting the said other ends of said urging members.

21. The chuck claimed in claim 20 wherein said split washers are fabricated from a metal substrate having a solid-lubricant coating deposited thereon.

22. The chuck claimed in claim 21 wherein said solid-lubricant coating is polytetrafluoroethylene.

23. The chuck claimed in claim 21 wherein said split washers are retained in place within said cylindrical bore by an internal snap ring.

24. The chuck claimed in claim 23 further comprising:
   a support ring located intermediate said internal snap ring and the peripheral margin of said split-washers.

25. The chuck claimed in claim 19 wherein said chuck body includes radially aligned and axially extending lobes defining interjacent spaces therebetween, said split washers having clearance openings formed therein to accept said lobes, said other ends of said spring arms projecting through said spring-arm-receiving openings into said interjacent spaces to contact said split washers.

* * * * *